United States Patent [19]

Maree

[11] Patent Number: 4,839,052
[45] Date of Patent: Jun. 13, 1989

[54] BIOLOGICAL TREATMENT OF WATER

[75] Inventor: Johannes P. Maree, Pretoria, South Africa

[73] Assignee: Council for Scientific and Industrial Research, Pretoria, South Africa

[21] Appl. No.: 212,037

[22] Filed: Jun. 23, 1988

Related U.S. Application Data

[63] Continuation of Ser. No. 24,042, Mar. 10, 1987, abandoned.

[51] Int. Cl.⁴ ............................................. C02F 3/30
[52] U.S. Cl. .................................... 210/603; 210/605; 210/611; 210/631; 210/750; 210/912
[58] Field of Search ............... 210/603, 605, 610, 611, 210/630, 631, 616, 617, 912, 913, 914, 188, 750

[56] References Cited

U.S. PATENT DOCUMENTS

| | | | |
|---|---|---|---|
| 1,964,487 | 6/1934 | Smith | 210/750 |
| 2,661,332 | 12/1953 | Mortenson | 210/188 |
| 3,310,477 | 3/1967 | Wilke | 210/603 |
| 3,388,057 | 6/1968 | Callahan | 210/603 |
| 3,409,545 | 11/1968 | Albertson | 210/631 |
| 3,674,428 | 7/1972 | Dean | 210/914 |
| 3,953,327 | 4/1976 | Parker | 210/630 |
| 3,957,632 | 5/1976 | Knopp | 210/616 |
| 3,964,998 | 6/1976 | Barnard | 210/605 |
| 3,994,802 | 11/1976 | Casey | 210/630 |
| 4,056,465 | 11/1977 | Spector | 210/605 |
| 4,134,830 | 1/1979 | Skogman | 210/605 |
| 4,200,523 | 4/1980 | Balmat | 210/631 |
| 4,315,823 | 2/1982 | Witt | 210/631 |
| 4,318,993 | 3/1982 | Ghosh | 210/631 |
| 4,354,936 | 10/1982 | Ishida | 210/603 |
| 4,431,543 | 2/1984 | Matsuo | 210/605 |
| 4,488,967 | 12/1984 | Block | 210/605 |
| 4,522,722 | 1/1985 | Nicholas | 210/605 |
| 4,522,723 | 6/1985 | Kauffman | 210/912 |
| 4,614,588 | 9/1986 | Li | 210/603 |
| 4,632,758 | 12/1986 | Whittle | 210/603 |
| 4,664,804 | 5/1987 | Morper | 210/631 |

FOREIGN PATENT DOCUMENTS

| | | | |
|---|---|---|---|
| 59-29092 | 2/1984 | Japan | 210/603 |
| 59-76597 | 5/1984 | Japan | 210/603 |
| 725371 | 8/1972 | South Africa | 210/603 |
| 753737 | 10/1975 | South Africa | 210/603 |

OTHER PUBLICATIONS

Burgess, S. G. and Wood, (1961) Pilot Plant Studies in Production of Sulphur from Enriched Sewage Sludge, J. Sci. Food Agric., 12, 326–341.

Lebel, (1985), Molasses Promoted Biological Sulphur Recovery from High Sulphate Wastes, Proceedings of the 40th Industrial Waste Conference, University of Purdue, West Lafayette, pp. 891–896.

Middleton, A. C. (1977), Kinetics of Microbial Sulphate Reduction, J. Wat. Pollut. Control Fed, 1659–1670.

Olthof, (1985), Development of Anaerobic Treatment Process for Wastewaters Containing High Sulphate, Proceedings of the 40th Industrial. Waste Conference, University of Perdue, W. Lafayette, pp. 871–877.

Uphaus (1982), Gypsum Bioconversion to Sulphur: A Two Step Microbiological Process in Developments in Industrial Microbiology, 24, St. Paul, Minnesota, 14 to 20, Aug., pp. 435–442.

Primary Examiner—Ernest G. Therkorn
Attorney, Agent, or Firm—Michael N. Meller

[57] ABSTRACT

The invention provides a process for the treatment of water containing dissolved calcium ions and dissolved sulphate ions. The water is passed at a pH of 5-8,5 through an anaerobic biological sulphate removal stage wherein microorganisms utilize sulphate ions in the water to produce hydrogen sulphide. The water from the sulphate removal stage is then passed through a hydrogen sulphide removal stage where hydrogen sulphide is removed therefrom. Water form the hydrogen sulphide removal stage is passed through an aerobic biological treatment stage wherein microorganisms cause at least partial biodegradation of any organic material remaining in the water and wherein calcium carbonate is precipitated. The invention also provides a biological water treatment installation which comprises an enclosed reservoir means which provides an anaerobic stage and which feeds into a hydrogen sulphide removal stge, which feeds into a reservoir means having oxygenating means therein for oxygenating water therein and providing an aerobic stage.

12 Claims, 1 Drawing Sheet

BIOLOGICAL TREATMENT OF WATER

This application is a continuation of application Ser. No. 024,042 filed 3/10/87, now abandoned.

This invention relates to the treatment of water. More particularly the invention relates to a process for the treatment of water containing dissolved calcium and sulphate ions, suitable for the biological purification of water containing sulphate ions and suitable for the biological production of sulphur.

According to the invention there is provided a process for the treatment of water containing dissolved calcium ions and sulphate ions, which process comprises the steps of:

passing the water at a pH of 5–8.5 through an anaerobic biological sulphate removal stage wherein microorganisms utilize the sulphate ions in the water to produce hydrogen sulphide;

passing the water from the anaerobic stage through a hydrogen sulphide removal stage where hydrogen sulphide is removed therefrom; and passing the water from the hydrogen sulphide removal stage through an aerobic biological treatment stage wherein microorganisms cause at least partial biodegradation of any organic material remaining in the water, and wherein precipitation of calcium carbonate takes place.

The process can in principle be carried out batchwise but is preferably carried out on a continuous basis, although enhanced calcium carbonate precipitation takes place in batchwise operation.

As used herein the term "anaerobic" stage refers to a stage wherein there is no molecular oxygen, and no nitrates or nitrites, and wherein sulphate reduction and anaerobic fermentation can take place. In turn, an "aerobic" stage is a stage in which there is a relatively free supply of molecular oxygen. In turn, an "anoxic" stage is a stage in which there is no molecular oxygen, but wherein there is a relatively free supply of nitrates and nitrites and in which sulphate reduction or anaerobic fermentation do not occur.

According to one aspect of the invention the process is suitable for the biological purification of water containing sulphate ions. Thus, prior to passing the water through the anaerobic stage, the water containing the calcium ions and sulphate ions may be obtained by adding calcium hydroxide to an acidic water supply containing sulphate ions in a neutralization stage, thereby to neutralize the water to within said pH range of 5–8.5, the process including the step of recirculating calciu carbonate precipitate from the aerobic stage to the neutralization stage, optionally with mixing, to assist in the neutralization of the water. In this regard, as mentioned above, water with a pH of 5–8.5 is regarded as "neutral" water, said pH preferably being 6.5–7.5.

In the case of water purification, the water at said pH range of 5–8.5 may be passed through an anoxic stage, which i upstream of said anaerobic stage and which contains microorganisms capable of utilizing nitrate and/or nitrite ions, the anoxic stage acting as a denitrification stage. This biological denitrification renders the process of the invention suitable for the purification of water which, in addition to sulphate ions, also contains nitrate and/or nitrite ions. By suitable control of the process conditions in the anoxic stage, eg the absence of molecular oxygen, a pH of 5–8.5, a temperature of 5°–40° C. and a chemical oxygen demand of not less than 50 mg/l, said microorganisms capable of utilizing nitrate ions can, in the presence of a metabolizable carbon source originally present in the water or added to the water as described hereunder, effect a biological denitrification, with the production of gaseous nitrogen compounds and carbon dioxide. If desired, several anoxic denitrification stages may be provided in series upstream of the anaerobic stage. Said denitrification will take place prior to the sulphate ion utilization in the anaerobic stage, without adversely affecting the abovedescribed biological reactions which take place in accordance with the process in the anaerobic and aerobic stages, for sulphate ion removal and biodegradation respectively. This embodiment of the invention contemplates the step of seeding the anoxic stage with microorganisms capable of biological denitrification, either from a selected strain, or from a mixed population of microorganisms as may be obtained from sewage or the like, the microorganisms capable of biological denitrification proliferating, at the expense of other microorganisms, in the anoxic stage. Examples of microorganisms suitable for denitrification include Achromobacter spp.
Aerobacter spp.
Alcaligenes spp.
Bacillus spp.
Flavobacterium spp.
Micrococcus spp.
Proteus spp.
Pseudomonas spp.

When the raw water feed contains ammonium ions, these ammonium ions will be converted to nitrates in the aerobic stage, provided that the sludge retention time in the aerobic stage is sufficiently high to prevent washout of nitrifying microorganisms, e.g. about 3 days or more, and provided that toxic substances such as heavy metals are present in sufficiently low proportions. Such nitrifying organisms, e.g. Nitrobacter spp. or Nitrosomonas spp., are typically present in natural raw waters or sources of metabolizable carbon such as sewage sludge, or can deliberately be seeded into the arobic stage.

The process may thus include the step whereby a proportion of the water leaving the aerobic stage is recirculated into the anoxic stage, for the removal of nitrates therefrom, the proportion recirculated being selected to provide an acceptably low level of nitrates in the water leaving the aerobic stage.

The water from the aerobic stage may be passed through at least one further anoxic stage downstream of said aerobic stage, and through at least one further aerobic stage downstream of said further anoxic stage, the further anoxic stages in the process alternating with the further aerobic stages, hydrogen sulphide from the hydrogen sulphide removal stage being fed into each further anoxic stage, and the water issuing finally from a further aerobic stage. This hydrogen sulphide addition to the further anoxic stages acts to enhance the removal of heavy metal complexs from the water being treated, as described hereunder.

In this regard it is to be noted that certain raw waters to be treated can contain, in addition to sulphates, complexes of heavy metals ions with cyanide and/or organic materials. While these complexes can be broken down biologically in an aerobic stage, they may be resistant to such breakdown and undesirable quantities thereof may be present in the water leaving the aerobic stage which follows immediately after the anaerobic hydrogen sulphide removal stage. The abovementioned further anoxic and further aerobic stages alternating in series reduce the heavy metal content of the water as the hydrogen sulphide introduced into the further anoxic stages promotes the precipitation as sulphides of the heavy metal ions in the complexes, while releasing cyanide and/or organic material for biological breakdown in each succeeding further aerobic stage. Sufficient pairs of further anoxic and aerobic stages should be provided to reduce heavy metal ion content, cyanide content and organic material (chemical oxygen demand) to acceptably low values. This feature of the invention (the plurality of further pairs of anoxic and aerobic stages with hydrogen sulphide feed into the anoxic stages) can be combined, if desired, with the ammonia removal described above and the associated recirculation from the aerobic stage immediately downstream of the hydrogen sulphide removal stage into the anoxic stage which is upstream of the anaerobic sulphate removal stage.

At least one of the abovementioned further stages may comprise a packed bed reactor containing a packing medium for removing weakly biodegradable substances such as tannins or phenols from water passing therethrough. Such stage may thus comprise a packed bed reactor containing a medium such as activated carbon or activated charcoal for removal of weakly biodegradable substances such as tannins and phenols, which reactor may be operated e.g. as an anoxic stage. The tannins and phenols etc are sorbed by the packing medium and held there for breakdown thereof by biological activity. In addition to such tannin and phenol removal, water passing through this stage will be polished with respect to heavy metal and calcium carbonate precipitates.

When the heavy metal precipitates can form a valuable by-product, the water being treated may be passed through a heavy, metal recovery stage prior to any biological treatment thereof, hydrogen sulphide from the hydrogen sulphide removal stage being fed into the heavy metal recovery stage. Removing heavy metals form the water as sulphides separately from the removal of sulphates from the water, can facilitate recovery of the heavy metal sulphides as by-products.

When the process applies to water purification and the raw water also contains other chalcogenates in addition to sulphates, such as selenates and/or tellurates, comprising Se(VI) and Te(VI) ions, these ions will be biologically reduced in the anaerobic sulphate removal stage to the corresponding Se(VI) and Te(IV) ions which react with the hydrogen sulphide and precipitate as insoluble selenium sulphides and tellurium sulphides; and/or said Se(VI) and Te(VI) ions may be reduced to the corresponding Se(II) and Te(II) ions, which react with heavy metals and precipitate respectively as heavy metal selenides and tellurides, and/or Se(VI) and Te(VI) ions may be reduced to the corresponding Se and Te metallic states. This will happen automatically when there are sufficient sulphate ions in the raw water to be treated, but if there are not, and the water being treated contains chalcogenates ions other than sulphate ions, the process may include the step of adding sulphate ions to the water upstream of the anaerobic sulphate removal stage.

Naturally, when sulphate ions are added to the water upstream of the anaerobic sulphate removal stage, the water may be neutralized if necessary, the addition of such sulphate ions acting to ensure that sufficient hydrogen sulphide is released in the anaerobic sulphate removal stage for the precipitation of the sulphides of Se(IV) and Te(IV). The various refinements of the process described herein when the process is used primarily for the removal of sulphates of the water are in principle also possible when the primary purpose of the invention is the removal of selenates and tellurates from the raw water, in analogous fashion, although the object of the process may primarily be for the removal of selenates an/or tellurates from raw water, rather than the removal of sulphates.

The process of the present invention can be also be applied to the biological production of sulphur from a source of calcium sulphate such as gypsum. In this case all the water issuing from the aerobic biological treatment stage which follows the anaerobic sulphate removal stage may be recirculated into the anaerobic sulphate removal stage, calcium sulphate being dissolved in the water passing from said aerobic stage to said anaerobic stage, calcium carbonate produced in said aerobic stage being removed from said aerobic stage and being then optionally converted to lime and carbon dioxide, and hydrogen sulphide from the hydrogen sulphide removal stage being optionally converted to sulphur. Make-up water may be added as required.

Naturally, if further anoxic and aerobic stages are provided as described above at positions downstream of the aerobic stage which follows the hydrogen sulphide removal stage, water issuing from one of these stages may be recirculated therefrom, and indeed a portion of the water issuing from the hydrogen sulphide removal stage can be recirculated, with calcium sulphate addition, to the anaerobic stage. However, as the process will typically involve full water recirculation when employed for sulphur production, there will usually be no stages following the aerobic stage which follows the anaerobic stage; and lime/carbon dioxide production is favoured by passing the full flow through said aerobic stage which follows the anaerobic stage, before any recirculation takes place. Furthermore it will be appreciated that, instead of producing sulphur as a primary product, the process may optionally produce as a primary product e.g. hydrogen sulphide, sodium sulphide, sodium hydrogen sulphide, or calcium sulphide, if desired.

Said calcium carbonate removed from the aerobic stage can be converted to lime and carbon dioxide by-products, eg by calcining, and, as mentioned above, hydrogen sulphide will typically be converted to sulphur as a primary product. This conversion may be by any well known conventional process such as the Clauss process, the Stretford process or the biological Cork process. In sulphur production according to the present process, although sulphur recovery and not sulphate ion removal from water is the primary object of the invention, the various refinements of the process described herein and relating to ammonia removal, the removal of any heavy metals in the water and recovery thereof, cyanide removal, removal of weakly biodegradable substances such as tannins and phenols, selenate and tellurate removal, polishing of the water, etc. can be applied if and as necessary.

The hydrogen sulphide removal stage may be a gas stripping stage in which hydrogen sulphide is stripped, e.g. by means of steam, nitrogen or carbon dioxide, from the water in a packed tower. This is to prevent hydrogen sulphide dissolved in water passing from the anaerobic sulphate removal stage into the succeeding aerobic stage from being oxidised in said aerobic stage back to sulphate ions. The packed tower may be packed eg with plastics or ceramic artifacts such as rings or the like, and the hydrogen sulphide gas so obtained can then act as a raw material for further processing to produce sulphur as described above. Naturally, vacuum stripping or other suitable stripping processes may be employed.

Naturally, where sulphur production is not important, the hydrogen sulphide may merely be allowed to escape from the water leaving the anaerobic sulphate removal stage, before said water reaches the initial aerobic stage.

The microorganisms which utilize the sulphate ions may comprise at least one species selected from the group comprising:

Desulphovibrio desulphuricans
Desulphovibrio vulgaris
Desulphovibrio salexigens
Desulphovibrio gigas
Desulphovibrio africanus
Desulphomaculum nigrificans
Desulphomaculum ruminis
Desulphomaculum orientis These microorganism, of which Desulphovibrio desulphuricans is a typical example, are capable, in the presence of a suitable source of metabolizable carbon and under anaerobic conditions, of metabolizing sulphate ions with the production of hydrogen sulphide. Such microorganism may initially be seeded into the sulphate removal stage from a cultivated source as a more or less pure strain of microorganisms, or, as they are typically present as part of a plurality of mixed species of microorganisms in various natural sources such as sewage, a suitable natural source of mixed microorganisms may be introduced into the sulphate removal stage where the process conditions will result in proliferation, at the expense of other microorganisms, of desirable microorganisms capable of growth and cell division in the anaerobic environment i.e. those which are capable, such as Desulphovibrio desulphuricans, of utilizing the sulphates in the water.

The process may include the step of feeding into the initial anaerobic sulphate removal stage a source of carbon which is metabolizable by the microorganisms which utilize the sulphate ions. Such source of metabolizable carbon, which may be admixed with the water fed into the sulphate removal stage or introduced thereto via a separate flow line, includes molasses, sugar such as sucrose, producer gas (i.e. carbon dioxide in the presence of hydrogen), sulphide pulp effluent or the like. Naturally, such carbon source may already be present in the water supply containing the sulphate ions, or when a source of a plurality of mixed species of microorganisms such as sewage is used continuously to seed the sulphate removal stage, such metabolizable carbon can be present in this source.

The process of the present invention is suitable for the treatment of lime-neutralized mine waters, such as are pumped as effluent waters from gold mines, which contain dissolved calcium ions, and the process is also suitable for sulphate ion-containing effluent waters from gold mine ore processing or other industrial sources, which do not necessarily contain dissolved calcium ions. When such effluent waters are acceptably neutral as regards pH, they can be treated directly in accordance with the process of the present invention, but if not, the process will typically include the preliminary step of neutralizing them e.g. by means of calcium hydroxide or recirculating calcium carbonate, as described above.

The anaerobic sulphate removal stage may be provided by one or more anaerobic reactors in series, such as packed bed reactors, sludge blanket reactors, fluidished bed reactors, rotating disc reactors, or the like, followed e.g. by the aforesaid hydrogen sulphide stripping stage. As regards the anaerobic sulphate removal stage, it should be noted that the cations of heavy metals such as silver, lead or the like, will form sulphides by reaction with the hydrogen sulphide produced in said stage, and these heavy metal sulphides will be in the form of precipitates which can be removed as solids from the anaerobic sulphate removal stage. It should further be noted, as regards the aerobic stage which follows the hydrogen sulphide removal stage, that a reduction of the chemical oxygen demand (COD) takes place therein, resulting from the biodegradation of organic material by the microorganisms therein, together with a reduction of the concentration of any cyanide in the water to be treated.

Suitable process conditions for operating the anoxic stage are described above. Suitable process conditions for operating the anaerobic stages are the absence of molecular oxygen, a pH of 5–8.5, a temperature of 10°–40° C. and a COD of not less than 50 mg/l; while suitable conditions for operating an aerobic stage are a concentration of molecular oxygen of more than 1 mg/l, a pH of 6–8.5, a temperature of 5°–40° C. and a COD of not less than 50 mg/l.

According to another aspect of the invention there is provided a biological water treatment installation which comprises:

reservoir means having an inlet for water to be treated and a water outlet, and being enclosed to provide an anaerobic stage for the biological removal from water therein of sulphate ions;

Hydrogen sulphide removal means for removing hydrogen sulphide from water, the hydrogen sulphide removal means having a water inlet connected to the water outlet of the anaerobic stage and having a water outlet; and reservoir means having a water inlet connected to the water outlet of the hydrogen sulphide removal stage and having a water outlet, and having oxygenating means therein for oxygenerating water therein so that it provides an aerobic biological treatment stage for the biological degradation of organic material in water therein, the aerobic stage also having an outlet for calcium carbonate precipitated therein.

The installation may include mixing means upstream of the anaerobic stage, having a water inlet for water to be treated and a water outlet connected to the water inlet of the anaerobic stage, this mixing means providing a neutralization stage for the neutralization of water entering it, the outlet for calcium carbonate precipitate from the aerobic stage being connected to a flow line for feeding said precipitate into the neutralization stage. The hydrogen sulphide removal means may comprise a stripping tower. An anoxic denitrification stage may be provided upstream of the anaerobic stage, and one or more pairs of further anoxic and aerobic stages may be provided, arranged in series downstream of the initial anaerobic sulphate removal stage and initial aerobic stage, the further anoxic and aerobic stages of the installation alternating in series in the direction of flow of water being treated through the installation, the final stage being an aerobic stage, and hydrogen sulphide flow lines optionally extending from the hydrogen sulphide removal means into each further anoxic stage, so that said further pairs of anoxic and aerobic stages act to remove heavy metal complexes with cyanide or organics from the water being treated.

BRIEF DESCRIPTION OF THE DRAWINGS

The invention will now be described, by way of example, with reference to the accompanying diagrammatic drawings in which.

DESCRIPTION OF THE PREFERRED EMBODIMENTS

Figure 1:
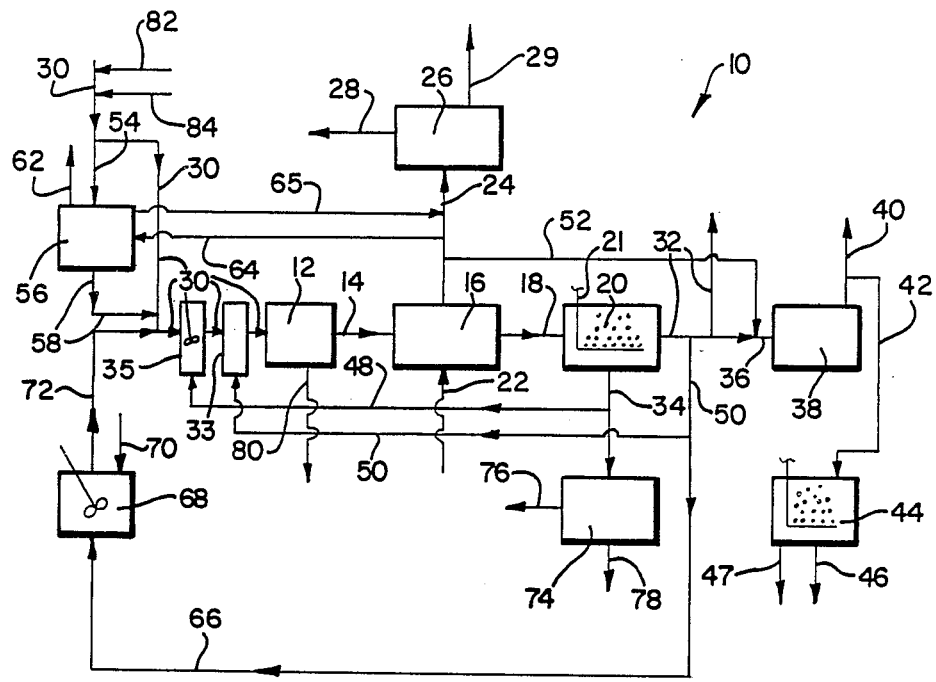
FIG. 1 shows a schematic flow diagram of a multipurpose installation in accordance with the present invention, for carrying our the various aspects of the process of the present invention.

In the drawing, reference numeral 10 generally designates a water treatment installation in accordance with the present invention. The installation 10 show is a multipurpose installation capable of carrying out all the various aspects of the process of the present invention, and it will be appreciated that other installations in accordance with the installation are possible, of a simplified nature, in situations where only certain aspects of the process of the present invention are to be carried out.

The installation comprises a primary anaerobic stage 12 feeding via a flow line 14 to a sulphide removal stage 16, which in turn feeds through a flow line 18 to an aerobic stage 20. The stripping stage 16 is shown provided with a feed line 22 for stripping gas, and a stripped product gas outlet flow line 24 leading to a sulphur production stage 26, shown having a sulphur product outlet flow line 28, and a stripping gas outlet flow line 29 which feeds into flow line 22.

A raw water feed line 30 is shown, entering the anaerobic stage 12, for feeding raw water to be treated into the anaerobic stage 12. The aerobic stage 20 in turn is shown with an outlet flow line 32 for water treated in the aerobic stage 20, and is shown with a preciptate or sludge outlet line 34, for solids product from the aerobic stage 20.

An anoxic stage is shown at 33, in the flow line 30 upstream of the anaerobic stage 12, and a mixing stage 35 is shown in the flow line 30, upstream of the anoxic stage 33 and the anaerobic stage 12.

A branch flow line 36, leading from the flow line 32 leaving aerobic stage 20, is shown leading into a further anoxic stage 38, which has a treated water outlet flow line 40. A branch flow line 42 from the outlet flow line 40 leads to a further aerobic stage 44, shown in turn having an outlet flow line 46 for treated water and a solids outlet flow line 47.

A recirculation flow line 48 is shown branching from the flow line 34 and leading into the mixing stage 35, and a recirculation flow line 50 is shown branching from the flow line 32 and leading into the anoxic stage 33. A flow line 52 is shown branching from the flow line 24 and leading via the flow line 36 into the anoxic stage 38.

A flow line 54 is shown branching from the flow line 30 and leading into a heavy metal removal stage 56, from which a liquid flow line 58 returns to the flow line 30. The heavy metals removal stage 56 is shown with a solids outlet flow line 62, and a flow line 64 is shown leading from the flow line 24 into the heavy metal removal stage 56. A flow line 65 for any unreacted hydrogen sulphide from the heavy metal removal stage 56 is shown returning from the stage 56 to the flow line 24.

A recirculation flow line 66 is shown branching from the flow line 32 and into a solids dissolving stage 68, which is provided with a solids feed line 70. The solids dissolving stage 68 has a liquid product flow line 72 shown leading into the flow line 30.

The flow line 34 is shown feeding into a calcining stage 74, which is shown having a carbon dioxide outlet flow line 76 and a calcined lime outlet flow line 78.

The anaerobic stage 12 shown in the drawing is provided by one or more reactors arranged in series, which may be packed bed reactors, sludge blanket reactors, fluidised bed reactors, so-called pelleted or granular reactors, completely mixed reactors or rotating disc units. The anaerobic stage 12 has a solids outlet flow line 80. Packed bed reactors and fluidized bed reactors, when used, may contain dolomitic gravel, power station fly ash, activated carbon or activated charcoal, plastics or ceramic artifacts such as rings, or the like, and certain reactors may be provided with settling tanks if required.

The hydrogen sulphide removal stage 16 is provided by a hydrogen sulphide stripping tower, and the aerobic stage 20 is provided by a aeration tank having oxygenating means 21 therein and clarifier. The sulpher production stage 26 is typically provided by means for carrying out the Clauss process, means for carrying out the Stretford process, means for carrying out the biological Corck process, or the like.

The anoxic stages 33 and 38 may be essentially similar to the anaerobic stage 12, the aerobic stage 44 being essentially similar to the aerobic stage 20. The mixing stage 35 may be a mechanically mixed vessel.

The heavy metals removal stage 56 is a clarifier which may employ sedimentation, flotation or centrifugal clarification techniques, and the dissolving stage 68 may be a mixing vessel, although, as mentioned hereunder, dissolving can be by passing water over heaps of material. The calcining stage 74 is typically provided by a calcining oven, kiln or the like.

The basic process of the present invention involves the feeding of raw water which contains sulphate ions dissolved therein via the flow line 30 into the anaerobic stage 12. In the anaerobic stage 12 biological sulphate ion removal takes place by virtue of the growth of microorganisms such as *Desulphovibrio desulphuricans* in the anaerobic stage. These microorganisms are initially introduced into the anaerobic stage 12 from a selected source such as a suitable strain of microorganisms capable of metabolizing, together with sulphate ions and under anoxic conditions, a suitable source of metabolizable carbon, resulting in the production of hydrogen sulphide. Instead, a mixed spectrum of microorganisms may be introduced into the anaerobic stage 12 from a source such as sewage, the anaerobic conditions in the stage 12 promoting proliferation of the microorganisms capable of metabolizing sulphate ions, at the expense of other microorganisms.

In the anaerobic stage 12, and indeed downstream thereof, the hydrogen sulphide produced reacts with heavy metals such as lead, silver or the like, to produce insoluble sulphide precipitates. When the anaerobic stage is provided by one or more sludge blanket reactors, such precipitates can settle out, to issue via the flow line 80. These sulphides can be discarded or, if they contain desirable heavy metals, they can be processed further by means of an aerobic treatment for recovery of these metals.

Indeed for all types of reactors in the stage 12, sludge from the stage 12 will typically be discharged via flow line 80. In this regard FIG. 2 shows a detail of a possible layout for the stage 12.

Figure 2:
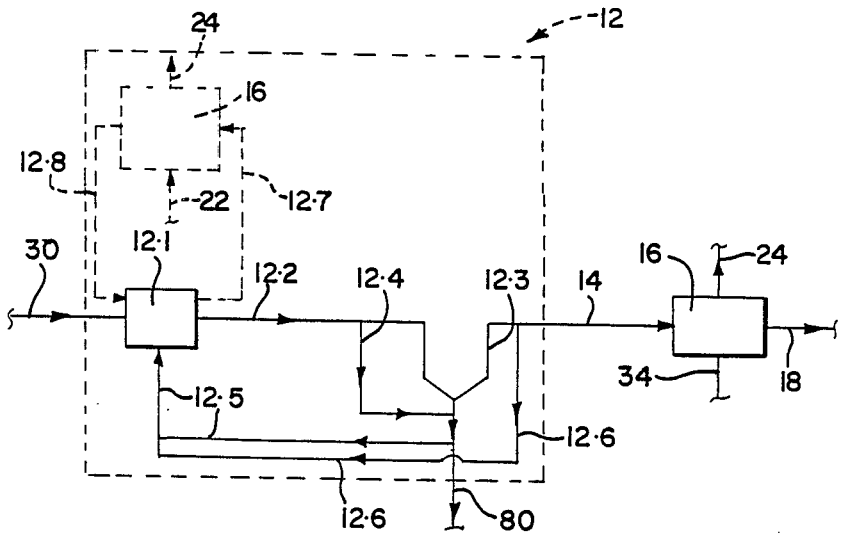
FIG. 2 shows a detail of a possible anaerobic stage of the flow diagram of FIG. 1.

In FIG. 2, reference numeral 12 generally designates the anaerobic stage 12, and unless otherwise specified, the same reference numerals refer to the same parts as in FIG. 1.

The anaerobic stage 12 is shown made up of an anaerobic reactor 12.1 discharging via flow line 12.2 into a settling stage 12.3, the flow lines 14 and 80 leading respectively from the liquid discharge and the sludge discharge of the settling stage 12.3. A further flow line 12.4 leads from flow line 12.2 to flow line 80.

In the case of a reactor 12.1 which is a completely mixed reactor, the solids (sludge) content in the reactor 12.1 can be raised by recirculating sludge to the reactor 12.1 via flow line 80 and a flow line 12.5. Flow line 12.5 leaves flow line 80 and feeds into reactor 12.1.

When the reactor 12.1 is a packed bed reactor, a sludge blanket reactor, a so-called granular or pelleted reactor, a rotating disc reactor, or a fluidized bed reactor, continuous recirculation along flow lines 80 and 12.5 as described above is not necessary, as sludge is sufficiently retained in the reactor 12.1. In these cases accumulated sludge is periodically removed from the reactor 12.1 by flushing liquid at a high rate through reactor 12.1 via flow lines 80 and 12.5, and returning the flow to the reactor 12.1 via a flow line 12.6 while sludge accumulates in settling stage 12.3 to be discharged via flow line 80. Flow line 12.6 leads from flow line 14 into flow line 12.5 and thence into reactor 12.1. Thus, in these cases sludge accumulates progressively in settling stage 12.3 from which it issues via flow line 80.

When the reactor 12.1 is a fluidized bed or packed bed reactor, enhanced upward fluid movement therethrough is desirable. This enhanced upward flow may be obtained by using flow line 12.4 partially to short-circuit settling stage 12.3, so that partial recirculation takes place via flow lines 12.4, 80 and 12.5 into reactor 12.1 during normal operation and when flushing is not taking place.

In regard it should be noted that the stripping stage 16, instead of being downstream of the settling stage 12.3 (in which case stripping of hydrogen sulphide may be effected using nitrogen, carbon dioxide or air as a stripping gas), may be adjacent the reactor 12.1 and upstream of the settling stage 12.3 (as shown in broken lines, in which case air will not be used as the stripping gas, but typically nitrogen or carbon dioxide). In this case liquid is circulated from the reactor 12.1 to the stripping stage 16 along flow line 12.7 and is returned from stripping stage 16 to reactor 12.1 along flow line 12.8.

When the stripping stage 16 is downstream of the anaerobic stage 12, the treated water from the anaerobic stage 12 passes along flow line 14 to the hydrogen sulphide removal stage 16, where it is stripped of hydrogen sulphide by means of a suitable stripping gas entering the stage 16 along flow line 22, the stripped hydrogen sulphide gas issuing from the stripping stage 16 via flow line 24. From flow line 24 the hydrogen sulphide gas passes to the sulphur recovery stage 26, where sulphur is produced which issues therefrom as a by-product, or indeed as a primary product, as described in more detail hereunder, along flow line 28. Spent stripping gas is recirculated from stage 20 vis flow line 29 to flow line 22.

The treated water from the hydrogen sulphide removal stage 16, flows along flow line 18 to the aerobic stage 20. In the aerobic stage 20 biological treatment of the water takes place wherein microorganisms cause precipitation therefrom of calcium carbonate.

The microorganisms active in the aerobic stage 20 can be introduced initially from a selected strain of suitable microorganisms, or can be introduced as a mixed spectrum from a source such as sewage, the microorganisms capable of causing precipitation of the carbonates proliferating in the aerobic stage 20 at the expense of other microorganisms. In the aerobic stage 20, the weakly soluble carbonates precipitate, and issue from the stage 20 along flow line 34. Treated product water issues from the aerobic stage 20 along flow line 32.

The aforegoing process describes the basic process of the present invention, and is appropriate for treating raw waters entering along flow line 30, which must have sulphate ions removed therefrom before they are reused or are discharged into rivers, streams, dams or the like. An example of such waters is water pumped from gold mines which contains sulphate ions therein, together with a proportion of alkaline earth metal cations such as magnesium and primarily calcium cations. Typically such waters are acid, and the process contemplates neutralization thereof, by means of the addition, prior to the anaerobic stage 12, of alkaline earth metal hydroxides such as calcium hydroxide, fed thereto along flow line 82, the flow line 30, between flow line 82 and stage 12, accordingly acting as a neutralization stage. A metabolizable carbon source such as molasses, sugar, sewage sludge, producer gas or the like is fed into the flow line 30 along flow line 84. Naturally, if the raw water contains sufficient metabolizable carbon, feeding thereof along flow line 84 can be omitted, and if the raw water is sufficiently neutral, neutralization thereof by feeding calcium hydroxide along flow line 82 can be omitted. The process however always contemplates feed water entering the anaerobic stage 12 which contains, in addition to sulphate ions, calcium ions and usually heavy metal ions.

In this primary application of the process, the calcium carbonate precipitate issuing from the aerobic stage 20 may be employed, discarded or processed further as described hereunder, and the product water 32 can be discharged into streams, rivers, dams or the like, or can be used, after further processing if necessary, as a by-product.

It is a feature of the process described above that the chemical oxygen demand of the water being treated is reduced in the aerobic stage 20, thereby improving the quality of water, particularly if it is to be discharged into streams or rivers. Similarly, in the aerobic stage 20, any dissolved cyanide, which is typically present in raw waters containing sulphate ions derived from the cyanide treatment of gold mine ores, is also broken down, the cyanide thereby being removed from the raw water.

It is a further feature of the aforesaid process that denitrification of the raw water, for the removal of nitrate ions therefrom, is promoted in the anoxic stage 33. Such denitrification is biological in nature, and takes place in the stage 33 before the removal of sulphate ions in the stage 12. As with the removal of sulphate ions, the microorganisms responsible for the denitrification can be introduced from a selected cultivated strain or can enter as part of a mixed spectrum of microorganisms, for example from sewage. The anoxic conditions in the stage 33 encourage proliferation of the microorganisms responsible for the denitrification at the expense of other organisms, and they consume the nitrates with the production of nitrogen gas, acetate oins and carbon dioxide. The denitrification microorganisms will compete with the organisms responsible for sulphate ion removal in a downstream anaerobic stage 12 as regards the carbon source, but are otherwise compatible therewith as they consume nitrate ions which are not consumed by the organisms which remove sulphate, and the sulphate removal microorganisms do not consume nitrate ions. It is accordingly an advantage of the invention that, if the raw water contains nitrate ions, denitrification thereof can take place in the stage 33, with the associated increase in purity of the product water, particularly if it is to be discharged into rivers or streams. Furthermore, the carbon dioxide produced will, in the subsequent aerobic stage, be consumed together with oxygen in the biological precipitation of calcium carbonate, leading to a further reduction in the chemical oxygen demand of the water, thereby further increasing its purity.

It is a yet further feature of the invention that ammonia (as ammonium ions) in the raw water can also easily be removed therefrom. In accordance with a further feature of the present invention ammonium ions are consumed in the aerobic stage 20 and biologically converted to nitrate ions. As these nitrate ions can be undesirable in the product water passing along flow line 32, a proportion of this water can be recirculated along branch line 50 into the anoxic stage 33, so that this recirculated water can undergo the denitrification described above in the anoxic stage 33. Indeed, when ammonia in the raw water is a problem, the water issuing from the aerobic stage 20 may, in addition to recirculation of a proportion thereof along flow line 50, be passed through one or more further anoxic stages and one or more further aerobic stages. These anoxic and aerobic stages will be arranged as described above to alternate so that there is an anoxic stage between two aerobic stages, and an aerobic stage between two anoxic stages.

In the drawing two further stages are shown dowsnstream from the aerobic stage 20, namely an anoxic stage 38 and an aerobic stage 44. Sufficient of these additional stages are provided, alternating in series, downstream of the stage 20 so that an acceptable removal of ammonia takes place, together with an accetably low level of nitrate in the final product water. In the situation shown in the drawing, where a single additional aerobic stage 38 is shown together with a single additional anoxic stage 44, all the flow issuing from the stage 20 along flow line 32 is channeled via branch flow line 36 into the stage 38, and thence along flow lines 40 and 42 to the aerobic stage 44, final product water issuing along flow line 46 from stage 44, eg into a stream, river or the like. It should be noted that this refinement of the process of the present invention continues to result in the reduction of heavy metals, of chemical oxygen demand and of any cyanide in the raw water.

In situations where the raw water contains heavy metal cations complexed with cyanide and/or complexed with organic material, the embodiment of the invention described above with additional anoxic and aerobic stages, downstream of the stage 20 and alternating in series, can further be modified, by the introduction of hydrogen sulphide gas into the water being treated, immediately upstream of each anoxic stage. Thus, in the drawing, the flow line 52 is shown arranged to transport hydrogen sulphide gas from the flow line 24 into the flow line 36 immediately upstream the anoxic stage 38. Each anoxic stage which may be present downstream from the aerobic stage 44 shown, can thus have its own hydrogen sulphide gas feed. Introduction of this hydrogen sulphide gas promotes the further precipitation of heavy metal sulphides in the additional anoxic stages, thereby releasing previously complexed cyanide and organic material which is, in its uncomplexed form, consumed in the aerobic stages which respectively follow and alternate with the anoxic stages. This refinement of the process leaves essentially uneffected the abovedescribed removal from the raw water of sulphate ions, alkaline earth metal ions, nitrate oins, and heavy metal ions, while improving removal from the water of cyanide and organic material, which organic material is precipitated in the aerobic stage 20 and the various additional aerobic stages such as the stage 44. Furthermore, any ammonia (ammonium ion) removal effected by the process is left anaffected.

When the raw water treated is acid, and requires neutralization, this neutralization is promoted by the recirculation of calcium carbonate-containing sludge from the aerobic stage 20 into the flow line 30 upstream of the anaerobic stage 12. This feature is illustrated by the flow line 48, leading from the flow line 34 into the flow line 30 via the mixing stage 35. It is contemplated in this case that substantially all the carbonate precipitated in the aerobic stage 20 can be recirculated along flow line 48, so that no carbonate is discarded or processed further which can otherwise be the case as described hereunder. Calcium hydroxide or the like will then be introduced along flow line 82 into flow line 30 only in such proportions as are necessary, in addition to the recirculated calcium carbonate, to neutralize the water. Bicarbonate ions from the recirculated calcium carbonate react with hydrogen ions in the raw water with the production of carbon dioxide.

When the raw water contains weakly biodegradable substances such as tannins and phenols, a refinement of the invention contemplates the inclusion of an additional anoxic stage, downstream of the aerobic stage 20. This anoxic stage is illustrated by the stage 38 in the drawing. This anoxic stage will be provided by a packed bed reactor packed with a suitable medium such as activated carbon for absorbing these substances and for promoting biological degradation thereof. This embodiment of the invention contemplates channelling the entire liquid flow issuing from the aerobic stage 20 via flow line 32 and flow line 36 into the stage 38, from which the product water issues along flow line 40 into a stream, river or the like. Naturally, however, if desired, when the process as described above contemplates one or more anoxic and aerobic stages alternating in series downstream of the anoxic stage 20 for other purposes, removal of said weakly biodegradable substances can be effected simply by ensuring that at least one of the anoxic stages, such as the stage 38, is packed with activated carbon. Furthermore, it should be noted that, when the anaerobic stage 12 comprises packed beds packed with activated carbon, removal of said weakly biodegradable substances will take place there; and it should also be noted that any anoxic stage 38 downstream of the aerobic stage 20 and packed with activated carbon will also result in polishing of the product water for improved purity. Other aspects of the process, such as heavy metal removal, cyanide removal, carbonate precipitation, etc are left essentially unaffected by this refinement of the invention.

When heavy metal ion removal is particularly desirable, for example when the heavy metal ions can form a valuable by-product or when the raw water contains an exceptionally high concentration of heavy metal oins, a yet further refinement of the process of the invention involves a heavy metal removal stage, shown by the stage 56 in the drawing, upstream of the anaerobic stage 12. In accordance with this embodiment of the process, the raw water flow is diverted from flow line 30 along flow line 54 into the stage 56, from which it passes along flow line 58 back into the flow line 30 and then into the anaerobic stage 12, all the raw water passing through the stage 56. This embodiment of the invention contemplates recirculation of hydrogen sulphide gas along flow line 64 into the stage 56, which is essentially a precipitation stage, in which heavy metal sulphides precipitate, and issue along a solids sulphide product flow line 62. These sulphides can be the sulphides of silver, cobalt, nickel, magnesium, zinc, lead, iron, tin or the like, and can be further processed, if desired, to refine one or more of the heavy metals in question therefrom. Excess hydrogen sulphide gas from stage 56 is returned to flow line 24 via flow line 65. Addition of this feature to the process leaves the above described other features of the present invention essentially unaltered, although, naturally, there will be little if any heavy residual metal sulphide precipitation in the stage 12.

In this regard it should be noted that calcium carbonate recirculation can take place if desired from the stage 20 (in the fashion of the recirculation described above along flow line 48) to a position upstream of the feed to the stage 56, to increase the pH of the water entering stage 56 prior to hydrogen sulphide addition to said stage 56. Furthermore, a plurality of stages 56 may be provided in series for selective heavy metal recovery, there being a calcium carbonate recirculation to the feed of each of these stages, and hydrogen sulphide feed to each of these stages. A different pH will thus be obtained in each stage 56, at which pH the heavy metal sulphide in question will be selectively precipitated. Furthermore, excess hydrogen sulphide gas will be returned from each of these stages 56 to the flow line 24. Indeed, whenever hydrogen sulphide is employed for heavy metal precipitation in accordance with the process, excess hydrogen sulphide can be returned to the flow line 24.

It is a yet further feature of the invention that, if chalcogenate ions other than sulphate ions are present in the raw water feed, such as selenate and or tellurate ions, these can also be removed from the water by the process of the present invention. Se(VI) and/or Te(VI) ions are reduced together with sulphates in the anaerobic stage 12 to the lower Se(IV) and/or Te(IV) valency, which ions can then react with the hydrogen sulphide to provide insoluble selenium sulphides and/or tellurium sulphides, and/or are reduced further too the Se(II) and /or Te(II) valency whereafter they precipitate as heavy metal selenides and/or heavy metal tellurides, and/or are reduced even further to the metallic Se and Te states. Removal of selenates and tellurates from the raw water further enhances the purity of the raw water, and this removal leaves the other features of the process of the present invention described above essentially uneffected.

In this regard, it should be noted that the present invention can be used for the primary purpose of selenate and/or tellurate removal from raw water, where such poisonous ions are the chief impurity (as opposed to sulphates) to be removed. It is necessary, however, for some sulphates to be present in the raw water, either initially or added if required, to provide a nutrient for the required bacteria.

A final important feature of the invention is that it can be used for the production of sulphur from calcium sulphate, eg gypsum. According to this feature of the invention raw water is initially made up from an ordinary water supply which does not necessarily contain dissolved sulphate ions, within which gypsum as a raw material is dissolved. This is illustrated in the drawing by the dissolving stage 68, which has a gypsum feed line 70. In accordance with this embodiment of the invention, all the water issuing along flow line 32 from the aerobic stage 20 can be diverted along branch flow line 66 into the dissolving stage 68, although, if there are further anoxic and aerobic stages downstream of the aerobic stage 20, recirculation can take place from a position downstream of the aerobic stage 20. In the dissolving stage 68, which is typically a mixed vessel, but which can instead merely comprise water sprayed on to heaps of gypsum and drained therefrom, the gypsum is dissolved and the solution produced issues from stage 68 along flow line 72 to flow line 30 where it becomes the feed for the anaerobic stage 12. This embodiment of the invention has sulphur as its primary product, all the hydrogen sulphide produced thus passing along flow line 24 to the sulphur production stage 26 and issuing as sulphur product along flow line 28. It should further be noted that the metabolizable carbon source must however continually be added eg along flow lines 84 and 30 to the anaerobic stage 12 and that this carbon is ultimately converted in the aerobic stage 20 to carbon dioxide and then to calcium carbonate which is precipitated in the aerobic stage 20, and issues along flow line 34. From flow line 34 carbonate passes into the calcining stage 74, where it is calcined to lime which issues as a by-product along flow line 78 and carbon dioxide which issues as a by-product along flow line 76.

In accordance with this embodiment of the invention the raw materials comprise essentially gypsum and a metabolizable carbon source. In principle, all the water employed can be recirculated along flow line 66, although there will naturally be losses, eg from the stripping stage 16 and the calcining stage 74. Such make-up water as is required, can be employed along flow line 30 to carry the metabolizable carbon source into the anaerobic stage 12. Naturally, if neutralization of any make-up water is required, some of the calcium hydroxide produced in the calcining stage 74 can be used for this purpose, and, if desired, some of the carbon dioxide produced in the calcining stage 74 can be recirculated to the aerobic stage 20 to enhance carbonate precipitation.

The refinement of the invention for the primary production of sulphur from gypsum in essence leaves the other features of the invention described above such as nitrate removal, ammonia removal, heavy metal removal, cyanide removal and organic material removal, removal of weakly biodegradable substances such as tannins and phenols and polishing, together with selenate and/or tellurate removal, essentially unaltered.

However, if the process is operated as a closed system having essentially gypsum and metabolizable carbon feeds with some water make-up, there will be no product water and removal of the aforesaid substances will be important only insofar as their aforesaid substances will be important only insofar as their build-up in the closed system may be undesirable.

Naturally, sulphur production from gypsum may be combined with raw water purification, in which case water recirculation along flow line 66 is partially or totally eliminated, the gypsum being dissolved in raw water entering the process along flow line 30. In this case the process of the present invention retains the desirable feature that the product water issuing therefrom can remain of enhanced purity in at least some respects compared with the raw water feed, by virtue of removal therefrom of one or more of the undesirable substances described above. Furthermore, it should be noted that gypsum deposits often contain soluble phosphates, and calcium phosphate precipitation will take place in the anaerobic stage 12 from which it can be removed as a by-product via flow line 80.

It is an advantage of the invention that it provides a flexible and versatile process for the purification of waters containing sulphate and/or other chalcogenate ions, which process is particularly suitable for the purification of waters from mining or chemical industries, and the process can also be used for the production of sulphur and other by-products.

I claim:

1. A process for the treatment of acid mine effluent water containing dissolved calcium ions and sulphate ions, which comprises the steps of:
    adding calcium hydroxide to a supply of said water in a neutralization stage:
    passing the water containing the dissolved calcium and sulphate ions at a neutral pH of 5 - 8.5 through an anaerobic biological sulphate removal stage wherein microorganisms utilize the sulphate ions in the water to produce hydrogen sulphide:
    passing the water from the anerobic stage through a hydrogen sulphide removal stage where hydrogen sulphide is removed therefrom;
    passing the water from the hydrogen sulphide removal stage through an aerobic biological treatment stage wherein microorganisms cause at least partial biodegradation of any organic material remaining in the water, and wherein precipitation of calcium carbonate takes place; and
    recirculating the calcium carbonate precipitate from the aerobic stage to the neutralization stage to assist in the neutralization of the pH of the water, the process including the step of feeding into the anaerobic biological sulphate removal stage a source of carbon which is metabolizable by the microorganisms which utilize the sulphate ions.

2. A process as claimed in claim 1 in which the water from the aerobic stage is passed through at least one anoxic stage downstream of said aerobic stage and through at least one further aerobic stage downstream of said anoxic stage, said anoxic stages alternating with said aerobic stages, hydrogen sulphide from the hydrogen sulphide removal stage being fed into each anoxic stage, and the water issuing finally from one of said aerobic stages.

3. A process as claimed in claim 2, in which at least one of said further stages comprises a packed bed packed with a packing medium for absorbing weakly biodegradable substances from water passing therethrough.

4. A process as claimed in claim 1, in which the water at said neutral pH is passed through an anoxic stage which is upstream of said anaerobic stage and which contains microorganisms capable of utilizing nitrate and/or nitrite ions, the anoxic stage acting as a denitrification stage.

5. A process as claimed in claim 4, in which a proportion of the water leaving the aerobic stage is recirculated into the anoxic stage.

6. A process as claimed in claim 1, in which the water being treated is passed through a heavy metal recovery stage prior to any biological treatment thereof, hydrogen sulphide from the hydrogen sulphide removal stage being fed in the heavy metal recovery stage.

7. A process as claimed in claim 1, in which the water being treated contains chalcogenate ions other than sulphate ions, the process including the step of adding sulphate ions to the water upstream of the anaerobic sulphate removal stage.

8. A process as claimed in claim 1, in which all the water issuing from the aerobic biological treatment stage which follows the anaerobic sulphate removal stage is recirculated into the anaerobic sulphate removal stage, calcium sulphate being dissolved in the water passing from said aerobic stage to said anaerobic stage, calcium carbonate produced in said aerobic stage being removed from said aerobic stage and being converted to lime and carbon dioxide, and hydrogen sulphide from the hydrogen sulphide removal stage being converted to sulphur.

9. A process as claimed in claim 1, in which the hydrogen sulphide removal stage is a gas stripping stage, in which hydrogen sulphide is stripped from the water in a packed tower.

10. A process as claimed in claim 1, in which the microorganisms which utilize the sulphate ions comprise at least one species selected from the the group comprising:
    Desulphovibrio desulphuricans
    Desulphovibrio vulgaris
    Desulphovibrio salexigens
    Desulphovibrio gigas
    Desulphovibrio africanus
    Desulphomaculum nigrificans
    Desulphomaculum ruminis
    Desulphomaculum orientis 11. A process for the treatment of water containing dissolved calcium ions and sulphate ions for the biological production of hydrogen sulphide, which comprises the steps of:
    adding calcium sulphate to a water supply to provide the water with dissolved calcium and sulphate ions;
    neutralizing the water containing calcium and sulphate ions in a neutralization stage;
    passing the water containing the dissolved calcium and sulphate ions at a neutral pH of 5–8.5 through an anaerobic biological sulphate removal stage wherein microorganisms utilize the sulphate ions in the water to produce hydrogen sulphide;
    passing the water from the anaerobic stage through a hydrogen sulphide removal stage where hydrogen sulphide is removed therefrom;
    passing the water from the hydrogen sulphide removal stage through an aerobic biological treatment stage wherein microorganisms cause at least partial biodegradation of any organic material remaining in the water, and wherein precipitation of calcium carbonate takes place; and recirculating the calcium carbonate precipitate from the aerobic stage to the neutralization stage to effect or assist in the neutralization of the pH of the water, the process including the step of feeding into the anaerobic biological sulphate removal stage a source of carbon which is metabolizable by the microorganisms which utilize the sulphate ions.

12. A process for the treatment of water to remove dissolved ions selected from the group comprising selenate ions and tellurate ions therefrom which comprises the steps of;

adding calcium sulphate to a supply of said water to provide the water with dissolved calcium and sulphate ions;

neutralizing the water containing sulphate ions in a neutralization stage;

passing the water containing the dissolved calcium and sulphate ions at a neutral pH of 5–8.5 through an anaerobic biological sulphate removal stage wherein microorganisms utilize the sulphate ions in the water to produce hydrogen sulphide;

passing the water from the anaerobic stage through a hydrogen sulphide removal stage where hydrogen sulphide is removed therefrom;

passing the water from the hydrogen sulphide removal stage through an aerobic biological treatment stage wherein microorganisms cause at least partial biodegradation of any organic material remaining in the water, and wherein precipitation of calcium carbonate takes place; and recirculating the calcium carbonate precipitate from the aerobic stage to the neutralization stage to effect or assist in the neutralization of the pH of the water.

* * * * *